United States Patent Office 3,365,457
Patented Jan. 23, 1968

3,365,457
N[(1-, 2-, 3-INDOLYL)-LOWER ALKYL]-1,5-IMINO-CYCLOALKANE AND -1,5-IMINOCYCLOALKENE DERIVATIVES
Bernard L. Zenitz, Colonie, N.Y., assignor to Sterling Drug Inc., New York, N.Y., a corporation of Delaware
No Drawing. Original application May 8, 1964, Ser. No. 366,192, now Patent No. 3,324,137, dated June 6, 1967. Divided and this application Jan. 3, 1967, Ser. No. 606,537
16 Claims. (Cl. 260—292)

This application is a division of my prior co-pending U.S. patent application Ser. No. 366,192, filed May 8, 1964, now Patent No. 3,324,137, granted June 6, 1967.

This invention relates to certain N-[(1, 2, and 3-indolyl) - lower-alkyl]-1,5-iminocycloalkanes and -1,5-iminocycloalkenes, their acid-addition and quaternary ammonium salts, and to intermediates and processes therefor.

In the compounds of my invention, the 1,5-iminocycloalkane or 1,5-iminocycloalkene ring has at least seven ring members, preferably seven or eight, and can be unsubstituted or substituted in the 3-position by such known types of radicals as hydroxy, acyloxy, halogen, oxo, carboalkoxy, and the like. In the case where a 1,5-iminocycloalkene is present, the ring preferably has the double bond at the 2,3-position of the ring.

A preferred aspect of the invention relates to compounds having the formulas:

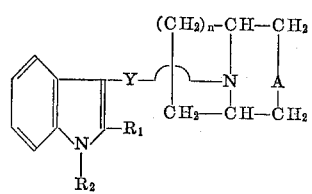

Ia

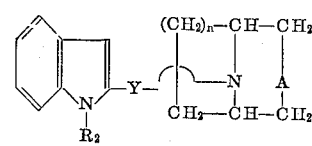

Ib

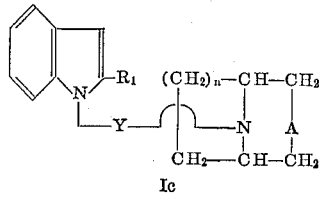

Ic

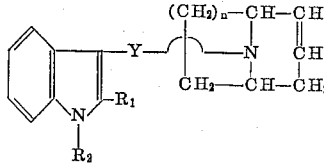

IIa

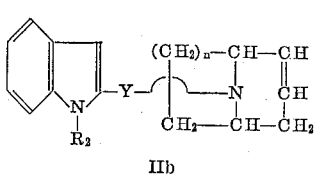

IIb

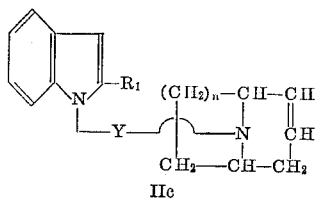

IIc which are also represented by the composite formulas:

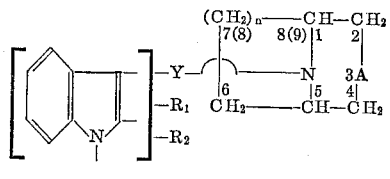

I

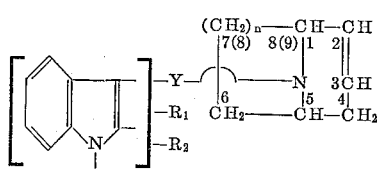

II where any of the three free valences at the 1-, 2-, and 3-positions of the indole ring in compounds of Formulas I and II can be taken up, respectively, by the 1,5-iminocycloalkanyl-lower-alkyl and 1,5-iminocycloalkenyl-lower-alkyl groups, and the valences at the 1- and 2-positions of the indole nucleus, when not taken up by the said groups, are taken up, respectively, by the groups $R_2$ and $R_1$, and where the benzene ring of the indole nucleus can be further substituted by substituents of a nature to be described hereinafter.

In the above Formulas I and II or Ia, Ib, Ic, IIa, IIb, and IIc, $R_1$ is a hydrogen atom or a lower-alkyl or phenyl group; $R_2$ is a hydrogen atom or a lower-alkyl or phenyl-lower-alkyl group; Y is lower-alkylene; $n$ is an integer from 1 to 2; and A is $CH_2$, CHOH, C=O, CHCl, CHBr, CH(O-Acyl), C(OH)(COO-lower-alkyl), or C(OH)(lower-alkyl).

In the above general Formulas I and II, when $R_1$ or $R_2$ represent lower-alkyl, they can have from one to four carbon atoms and can be straight or branched, and thus stand for such groups as methyl, ethyl, propyl, isopropyl, butyl, isobutyl, and the like.

In the above general Formulas I and II, when $R_1$ represents phenyl, or when $R_2$ represents phenyl-lower-alkyl, the benzene ring thereof can be unsubstituted or can bear one or more substituents of low molecular weight and of such nature that they do not interfere with or take part in the reactions, to be described hereinafter, used in the preparation of the compounds. Moreover, the benzene ring of the indole nucleus can also be further substituted by one or more like substituents. Examples of such substituents include lower-alkyl, halo, lower-alkoxy, lower-alkylmercapto, lower-alkylsulfonyl, trifluoromethyl, sulfamoyl, methylenedioxy, benzoyloxy, nitro, cyano, and the like.

In the above general Formulas I and II, Y represents a lower-alkylene bridge having from to to about six carbon atoms which can be straight or branched, and thus includes such groups as ethylene, propylene, 1-methylethylene, 2-methylethylene, butylene, pentylene, hexylene, and the like.

In the above general Formulas I and II, $n$ is 1 or 2. When $n$ is 1, the 1,5-iminocycloalkane moiety is a cycloheptane ring, and the whole molecule is a derivative of nortropane.

When $n$ is 2, the 1,5-iminocycloalkane moiety is a cyclooctane ring, and the whole molecule is a derivative of granatanine. The numbering systems are in accordance with the standard nomenclature used in The Ring Index (Patterson and Capell, Reinhold Publishing Corp., 1960) and in Chemical Abstracts. In the 1,5-iminocycloalkane or -alkene moiety the parenthetical numbers 8 and 9 are used in the case where $n$ is 2.

In the above general Formula I, A represents, inter alia, a CH(O-Acyl) group. The exact nature of the Acyl group is not critical, provided it is a carboxylic acyl group of relatively low molecular weight, less than about 250. A preferred group of acyl radicals includes lower-alkanoyl, for example, formyl, acetyl, propionyl, butyryl, isobutyryl, valeryl, caproyl, and the like; carboxy-lower-alkanoyl, for example, hemi-succinyl, hemi-glutaryl, hemi-adipyl, and the like; benzoyl; phenylacetyl; lower-alkenoyl, for example, acryloyl, crotonoyl, and the like; cinnamoyl; and carbamyl, CONR'R'', when R' and R'' are hydrogen or lower-alkyl groups, for example carbamyl, N-methylcarbamyl, N,N-dimethylcarbamyl, and the like. When the Acyl group represents benzoyl, phenylacetyl, or cinnamoyl, the benzene ring thereof can be unsubstituted or can bear one or more substituents of low molecular weight and of such nature that they do not interfere with or take part in the reaction, to be described hereinafter, used to produce the compounds. Examples of such substituents include lower-alkyl, halo, lower-alkoxy, lower-alkylmercapto, lower-alkylsulfonyl, trifluoromethyl, sulfamoyl, methylene dioxy, benzyloxy, nitro, cyano, and the like.

The compounds of the invention are prepared by reacting a (1-, 2-, or 3-indolyl)-lower-alkyl halide with a 1,5-iminocycloalkane or 1,5-iminocycloakene. The reaction is represented by the equations where $R_1$, $R_2$, A, Y, and $n$ have the meanings given above, and Hal represents halogen.

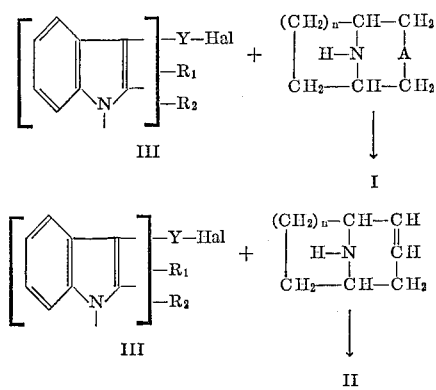

In the compounds of Formula III, the three free valences at the 1-, 2-, and 3-positions of the indole nucleus can be taken up by the group Y-Hal, and the valences at the 1- and 2-positions, when not taken up by the said group, are taken up by the groups $R_2$ and $R_1$, respectively.

A prefered method comprises heating the reactants at a temperature between about 50° C. and 150° C. in the presence of an acid-acceptor. The reaction is preferably carried out in an organic solvent, inert under the conditions of the reaction, for example, anhydrous lower-alkanols, benzene, xylene, and the like. The acid-acceptor neutralizes the hydrogen halide which is split out during the course of the reaction, and is a basic substance which forms water-soluble by-products easily separable from the main product of the reaction, including such substances as alkali metal salts of weak acids, e.g. sodium carbonate, potassium carbonate, sodium acetate, sodium alkoxides, sodium amide, and the like. The acid-acceptor can also be in the form of an excess quantity of the 1,5-iminocycloalkane or -alkene, which can be recovered in the form of the hydrohalide salt and used again.

Alternatively, the compounds of Formulas I and II are prepared by reacting a (1-, 2-, or 3-indolyl)-lower-alkane mixed anhydride, of Formula IV below, with a 1,5-iminocycloalkane or 1,5-iminocycloalkene to give the N-[(1-, 2-, and 3-indolyl)-lower-alkanoyl]-1,5-iminocycloalkanes or -alkenes of Formulas V and VI, below, respectively. The reaction is preferably carried out at a temperature between about —20° C. and about 20° C. in an organic solvent inert under the conditions of the reaction, for example acetone, ether, ethylene dichloride, and the like. The mixed anhydrides in turn are prepared by reacting a (1-, 2-, or 3-indolyl)-lower-alkanoic acid with lower-alkyl haloformate. The reaction is preferably carried out in the presence of an acid-acceptor, for example triethylamine, at a temperature between about —20° C. and about 20° C. in an organic solvent inert under the conditions of the reaction, for example acetone, ether, ethylene dichloride, and the like. Acetone is the preferred solvent. The acid-acceptor, which takes up the hydrogen halide split out during the course of the reaction, is preferably a basic substance which forms water-soluble by-products easily separable from the product.

The N-[(1-, 2-, and 3-indolyl)-lower-alkanoyl]-1,5-iminocycloalkanes and -alkenes of Formulas V and VI are then reduced to the respective compounds of Formulas I and II by reacting the former with an alkali metal aluminum hydride at a temperature between about 0° C. and about 65° C. in an organic solvent inert under the conditions of the reaction, for example ether or tetrahydrofuran. It is preferred to use lithium aluminum hydride in refluxing tetrahydrofuran. The above-described reactions are represented by the following equations where $R_1$, $R_2$, $R_3$ and $n$ have the meanings given above, Y' is lower-alkylene having from one to five carbon atoms, Alk represents lower-alkyl, and A is $CH_2$, CHOH, CHCl, CHBr, or C(OH)(lower-alkyl).

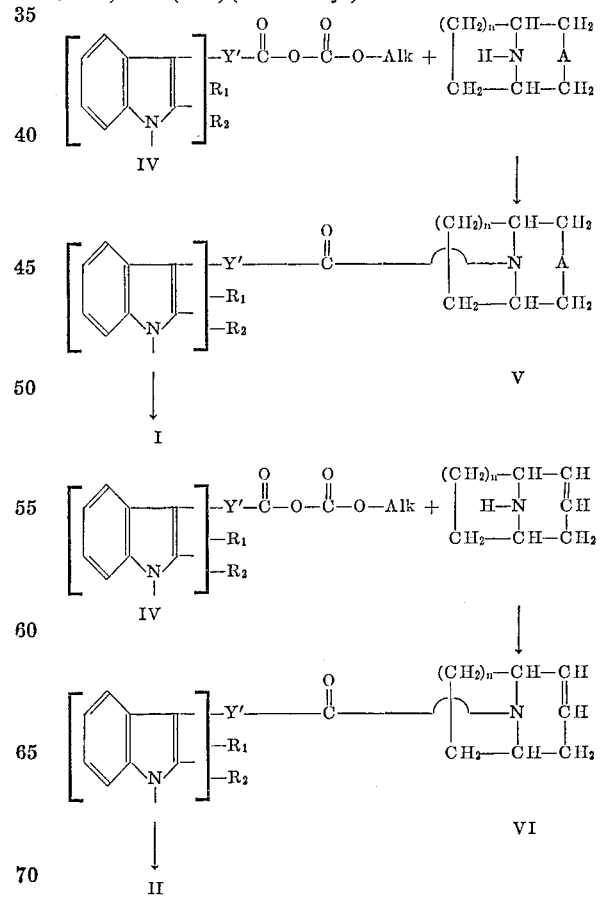

In the compounds of Formulas V and VI, the three free valences at the 1-, 2-, and 3-positions of the indole nucleus can be taken up, respectively, by the N-(lower-alkanoyl)-1,5-imino-cycloalkane and N-(lower-alkanoyl)-

1,5-iminocycloalkene groups, and the valences at the 1- and 2-positions, when not taken up by the said groups, are taken up, respectively, by the groups $R_2$ and $R_1$.

The various groups represented by A in the above general Formula I are readily interconvertible. Compounds bearing a hydroxy group in the 3-position of the 1,5-iminocycloalkane ring can be esterified by conventional methods, as by heating with the appropriate acid halide or acid anhydride, to give the corresponding acyloxy compounds. 3-hydroxy compounds can also be oxidized to the corresponding 3-oxo compounds, e.g. with chromic oxide, and conversely, the oxo compounds reduced to the hydroxy compounds, e.g. by catalytic hydrogenation. The hydroxy compounds can be dehydrated to introduce a double bond between 2- and 3-positions of the 1,5-iminocycloalkane ring, e.g. by heating with mineral acid, potassium bisulfate, or the like, and the double bond reduced to give compounds unsubstituted in the 3-position (A is $CH_2$). Alternatively, the hydroxy group in the 3-position can be replaced by chlorine or bromine by treating with thionyl chloride or thionyl bromide, and the resulting 3-chloro or 3-bromo compound can then be dehydrohalogenated by heating with a base, such as alkali metal hydroxides or alkoxides or amino compounds, to give the same unsaturated compound obtained by dehydration of the 3-hydroxy compound.

The compounds and intermediates wherein A is C=O are converted to compounds where A is C(OH)(lower-alkyl) by a Grignard reaction with a lower-alkyl-lithium. Compounds wherein A is C=O also serve as intermediates for the compounds where A is C(OH)(COO-lower-alkyl). Thus reaction of the former with hydrogen cyanide gives the cyanohydrin [A is C(OH)(CN)] which can then be hydrolyzed to the corresponding carboxylic acid [A is C(OH)(COOH)] and esterified with a lower-alkanol.

These changes in the group A are preferably effected before the 1,5-iminocycloalkane and (1-, 2-, and 3-indolyl)-lower-alkyl moieties are combined in order to avoid side reactions. The foregoing is summarized in the following flowsheet (X is Cl or Br):

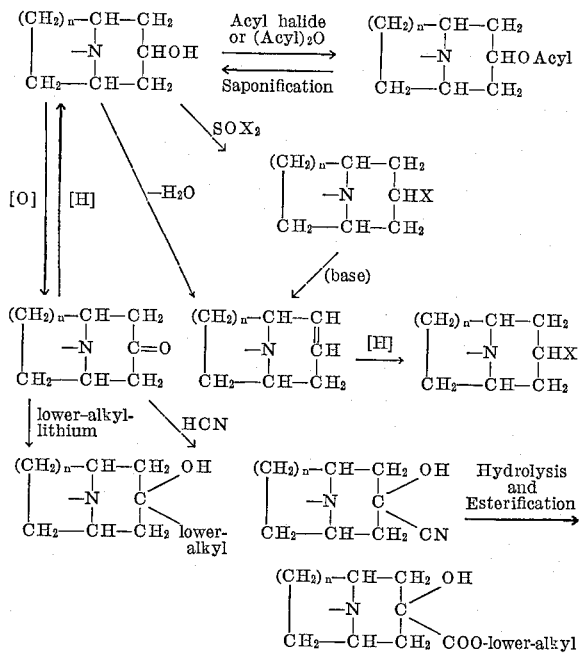

The novel compounds of the instant invention are the bases of Formulas I and II and the acid-addition and quaternary ammonium salts of said bases, and said acid-addition and quaternary ammonium salts are considered to be the full equivalents of the free bases. The compounds of the invention in the free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates and alkali metal bicarbonates. The bases thus regenerated can then be interacted with the same or a different acid to give back the same or a different acid-addition salt. Thus the novel bases and all of their acid-addition salts are readily interconvertible.

The quaternary ammonium salts are obtained by the addition of esters of strong acids to the free base form of the compounds, said esters having a molecular weight less than about 200. A preferred class of esters comprises alkyl, alkenyl, and phenyl-lower-alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, chloride p-nitrobenzyl chloride, p-methoxybenzyl chloride, o-chlorobenzyl chloride, and the like.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

It is also possible to convert one quaternary ammonium salt to another in which the anion is different. If the anion of the original quaternary salt forms a water-insoluble silver salt the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid can be prepared.

It will thus be appreciated that Formulas I and II not only represent the structural configuration of the bases of my invention but each is also representative of the respective structural entity which is common to all of my respective compounds, whether in the form of the free bases or in the form of the acid-addition salts of the bases. I have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-accepable acid-addition salt by, for example, ion-exchange procedures.

It will be appreciated from the foregoing that all of the acid-addition and quaternary ammonium salts of my new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new N-[(1-, 2-, and 3-indolyl)-lower-alkyl]-1,5-iminocycloalkanes and -1,5-iminocycloalkenes and not in any particular acid or quaternary moiety or acid anion associated with the salt forms of my compounds; rather, the acid or quaternary moieties or anions which can be associated in the salt forms are in themselves neither novel nor critical and therefore can be any acid anion or acid-like substance capable of salt formation with bases. In fact in aqueous solutions, the base form or water-soluble acid-addition salt form of the compounds of the invention both possess a common protonated cation or ammonium ion.

Thus the acid-addition salts discussed above and claimed herein are prepared from any organic acid, inorganic acid (including organic acids having an inorganic group therein), or organo-metallic acid, organic mono- and poly-sulfonic and -sulfinic acids, organic phosphonic and phosphinic acids, organic acids of arsenic and antimony, organic heterocyclic carboxylic, sulfonic, and sulfinic acids, acidic ion-exchange resins, and inorganic acids of any acid forming element or combination of elements. In addition, other salt-forming compounds which are acidic in their chemical properties but which are not generally considered as acids in the same sense as carboxylic or sulfonic acids are also considered to be among the numerous acids which can be used to prepare acid-addition salts of the compounds of the invention. Thus there is also comprehended acidic phenolic compounds and acidic compounds having "activated" or acidic hydrogen atoms, as for example, picrolonic acid, or barbituric acid derivatives having an acidic proton. Also comprehended as salt forming agents are so-called Lewis acids which lack a pair of electrons in the outer "electron shell" and react with basic compounds having an unshared pair of electrons to form salts, for example boron trifluoride.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, p-aminophenylarsinic acid, phenylstibnic acid, phenylphosphinous acid, methylphosphonic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formulas I and II has demonstrated that they possess a variety of depressant actions on the central nervous system, the cardiovascular system, and the skeletal muscular system. They lower the blood pressure in rats and they possess anticonvulsant activity in mice as evidenced by their ability to protect mice from maximal electroshock-induced convulsions. These activities indicate their usefulness as hypotensive agents and anticonvulsants.

Thus the minimum effective hypotensive dose (MEHD) of each of 8-[3-(3-indolyl)propyl]nortropane; 8-[3-(1-indolyl)propyl]-3α-hydroxynortropane hydrochloride; and 8-[3-(1-indolyl)propyl]nortropane hydrochloride was found to be 1.0 mg./kg. when administered subcutaneously in rats.

8-[3-(1-indolyl)propyl]-3α-hydroxynortropane hydrochloride, administered intraperitoneally at a dose of 100 mg./kg. in mice, was found to protect 83% of the animals tested for a period of thirty minutes against maximal electroshock-induced convulsions.

The compounds can be prepared for pharmaceutical use by dissolving under sterile conditions a salt form of the compounds in water (or an equivalent amount of a non-toxic acid if the free base is used), or in a physiologically compatible aqueous medium such as saline, and stored in ampoules for intramuscular injection. Alternatively, they can be incorporated in unit dosage form as tablets or capsules for oral administration or in combination with suitable adjuvants such as calcium carbonate, starch, lactose, talc, magnesium stearate, gum acacia, and the like. Still further the compounds can be formulated for oral administration in aqueous alcohol, glycol, or oil solution or oil-water emulsions in the same manner as conventional medicinal substances are prepared.

The chemical structures of the compounds of the invention are established by their mode of synthesis and are corroborated by the correspondence between calculated values for the elements and values found by chemical analysis.

The following examples will further illustrate specific embodiments of the invention without the latter being limited thereto.

EXAMPLE 1

*8-[3-(3-indolyl)propyl]-3α-hydroxynortropane hydrochloride*

[I*a*: $R_1$ and $R_2$ are H; Y is $(CH_2)_3$; A is CHOH; *n* is 1].—A mixture of 9.5 g. (0.04 mole) of 3-(3-indolyl) propyl bromide, 5.1 g. (0.04 mole) of nortropine, and 6.4 g. (0.06 mole) of anhydrous powdered sodium carbonate in 150 ml. of absolute ethanol was heated under reflux with stirring for twenty-four hours. The mixture was filtered to remove insoluble inorganic salts, the filter washed with ethanol, and the combined filtrates taken to dryness on a steam bath. The residue was taken into boiling benzene and the combined benzene extracts were washed several times with water, several times with dilute hydrochloric acid, and several times with water again until the washings were neutral. The combined aqueous acid extracts were combined and rendered basic with concentrated ammonium hydroxide. The resulting oil was extracted into chloroform, the chloroform extracts dried, taken to dryness, and the residual oil dissolved in 100 ml. of ether and acidified with ethereal anhydrous hydrogen chloride. The solid which separated was filtered, washed with ether, dried, and recrystallized twice from methanol-ethyl acetate, giving 3.5 g. of 8-[3-(3-indolyl)propyl]-3α-hydroxynortropane hydrochloride, M.P. 254.6–257.2° C. (corr.).

8-[3-(3-indolyl)propyl]-3α-hydroxynortropane reacts with formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give, respectively, the formate, acetate, isobutyrate, alpha-mercaptopropionate, malate (or acid malate), fumarate (or acid fumarate), succinate (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2-furancarboxylate, cholate, pyrenecarboxylate, 2-pyridinecarboxylate, 3-indoleacetate, quinate, sulfamate, methanesulfonate, isethionate, benzenesulfonate, p-toluenesulfonate, benzenesulfinate, butylarsonate, diethylphosphinate, p-aminophenylarsinate, phenylstibnate, phenylphosphinite, methylphosphonate, phenylphosphinate, Amberlite® XE–66 resin salt, hydrofluoride, hydrochloride, hydrobromide, hydriodide, perchlorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate, and boron trifluoride salts.

8-[3-(3-indolyl)propyl]-3α-hydroxynortropane can be reacted with hydriodic acid to form 8-[3-(3-indolyl)propyl]-3α-hydroxynortropane hydriodide, useful as a characterizing intermediate.

8-[3-(3-indolyl)propyl]-3α-hydroxynortropane, in the form of its hydriodide salt, can be converted to the hydriodide salt by passing an aqueous solution of the former over an ion exchange resin saturated with chloride ions, for example, Rohm and Haas Amberlite® IRA–400 resin.

8-[3-(3-indolyl)propyl]-3α-hydroxynortropane can be converted to its hydriodide salt and the latter recrystallized for purification purposes from an appropriate organic solvent. On suspension of the hydriodide in dilute sodium hydroxide, extraction of the suspension with chloroform, and removal of the chloroform from the extracts, 8-[3-(3-indolyl)propyl]-3α-hydroxynortropane can be recovered in purified free base form.

EXAMPLE 2

*8-[2-(3-indolyl)ethyl]-3β-hydroxynortropane*

[Ia: $R_1$ and $R_2$ are H; Y is $CH_2CH_2$; A is CHOH; $n$ is 1] was prepared from 6.7 g. (0.03 mole) of 2-(3-indolyl)ethyl bromide, 4.1 g. (0.03 mole) of pseudonortropine, and 3.2 g. (0.03 mole) of anhydrous powdered sodium carbonate in 100 ml. of absolute ethanol using the manipulative procedure described above in Example 1. The crude product was isolated in the form of the free base, and the latter recrystallized several times from acetone giving 3.5 g. of 8-[2-(3-indolyl)ethyl]-3β-hydroxynortropane, M.P. 180.0–181.8° C. (corr.).

EXAMPLE 3

*8-[2-(3-indolyl)ethyl]-3α-hydroxynortropane*

[Ia: $R_1$ and $R_2$ are H; Y is $CH_2CH_2$; A is CHOH; $n$ is 1] was prepared from 17.9 g. (0.08 mole) of 2-(3-indolyl)ethyl bromide, 11.2 g. (0.088 mole) of nortropine, 9.5 g. (0.09 mole) of anhydrous powdered sodium carbonate in 225 ml. of anhydrous ethanol using the manipulative procedure described above in Example 1. The crude product was isolated in the form of the free base and recrystallized from ether giving 7.8 g. 8-[2-(3-indolyl)ethyl]-3α-hydroxynortropane, M.P. 133.6–140.7° C. (corr.).

EXAMPLE 4

*8-[2-(3-indolyl)ethyl]nortropane*

[Ia: $R_1$ and $R_2$ are H; Y is $CH_2CH_2$; A is $CH_2$; $n$ is 1] was prepared from 4.48 g. (0.02 mole) of 2-(3-indolyl)ethyl bromide and 4.9 g. (0.04 mole) of nortropane in 200 ml. of acetonitrile using the manipulative procedure described above in Example 1. The crude product was isolated in the form of the free base and recrystallized twice from hexane giving 3.4 g. of 8-[2-(3-indolyl)ethyl]nortropane, M.P. 134.0–135.2° C. (corr.).

EXAMPLES 5–19

By following the manipulative procedure described above in Example 1, substituting for the 3-(3-indolyl)propyl bromide and the nortropine used therein equivalent amounts of an appropriate substituted 3-(1-indolyl)propyl halide and an appropriate substituted 3-(1-indolyl)propyl halide and an appropriate 1,5-iminocycloalkane, there can be obtained the compounds of Formula Ic listed below in Table 1 where Y in each case is $(CH_2)_3$, and $n$ in each case is 1, and where the column headed "Indole subst." refers to the substituent in the benzene ring of the indole nucleus.

TABLE 1

| Example | Indole subst. | $R_1$ | A |
|---|---|---|---|
| 5 | 5-Cl | $CH_3$ | C=O |
| 6 | 6-Br | $C_4H_9$ | CHCl |
| 7 | 7-F | $C_6H_5$ | CHBr |
| 8 | 7-I | 4-$CH_3C_6H_4$ | $CH(OCOCH_3)$ |
| 9 | 4-$CH_3$ | 4-$ClC_6H_4$ | $CH[OCO(CH_2)_3COOH]$ |
| 10 | 5-$CH_3O$ | 4-$CH_3OC_6H_4$ | $CHOCOC_6H_5$ |
| 11 | 5-HO | 4-$CH_3SC_6H_4$ | $CHOCOCH_2C_6H_5$ |
| 12 | 5,6-$OCH_2O$ | 4-$CH_3SO_2C_6H_4$ | $CHOCOCH=CH_2$ |
| 13 | 5,6-$OCH_2CH_2O$ | 3-$CF_3C_6H_4$ | $CHOCOCH=CHC_6H_5$ |
| 14 | 7-$CH_3S$ | 3-$NH_2SO_2C_6H_4$ | $CHOCONH_2$ |
| 15 | 7-$CH_3SO$ | 3,4-$OCH_2OC_6H_3$ | $CHOCONHCH_3$ |
| 16 | 7-$CH_3SO_2$ | 3-$C_6H_5CH_2OC_6H_4$ | $CHOCON(CH_3)_2$ |
| 17 | H | 3-$NO_2C_6H_4$ | CHOH |
| 18 | 4-$CF_3$ | 3-$CNC_6H_4$ | CHOH |
| 19 | H | 4-$CH_3$-3-$ClC_6H_3$ | CHOH |

EXAMPLE 20

8-[3-(3-indolyl)propyl]nortropane

[Ia: $R_1$ and $R_2$ are H; Y is $(CH_2)_3$; A is $CH_2$; n is 1].—To a solution of 9.46 g. (0.05 mole) of β-(3-indolyl)-propionic acid and 5.5 g. (0.05 mole) of triethylamine in 150 ml. of anhydrous acetone was added dropwise with stirring a solution of 6.8 g. (0.05 mole) of isobutyl chloroformate in 100 ml. of acetone while maintaining the temperature at about −10 to −12° C. The solution was then treated with a solution of 5.55 g. (0.05 mole) of nortropane in 100 ml. of acetone over a period of about twenty-five minutes, while maintaining the temperature at about −8 to −13° C. The mixture was then stirred at room temperature for two hours, filtered, and the filtrate taken to dryness in vacuo. The residue was dissolved in warm benzene, washed once with water, twice with equeous sodium bicarbonate, twice with water again, twice with dilute hydrochloric acid, and finally four times with water, and the organic layer taken to dryness. The residue was recrystallized three times from an ethyl acetate-hexane mixture giving 8.4 g. of 8-[β-(3-indolyl)-propionyl] nortropane, M.P. 119–120.5° C. (uncorr.).

The latter (7.05 g., 0.025 mole), dissolved in 250 ml. of dry tetrahydrofuran, was added to a stirred slurry of 1.90 g. (0.05 mole) of lithium aluminum hydride in 200 ml. of dry tetrahydrofuran. When addition was complete, the mixture was stirred under reflux for about six hours, allowed to cool, and the gray slurry decomposed by the dropwise addition of about 7 ml. of water. The mixture was filtered, the filter cake washed with two 100 ml. portions of tetrahydrofuran, and the combined filtrates were evaporated to dryness in vacuo giving a dark viscous oil. The latter was extracted with ten 100 ml. portions of hot hexane, and the combined extracts were evaporated to a volume of about 100 ml. On cooling, a solid separated, and the latter was collected and recrystallized from hexane giving 3.66 g. of 8-[3-(3-indolyl)propyl]nortropane, M.P. 127.0–128.8° C. (corr.).

EXAMPLE 21

8-[3-(1-indolyl)propyl]nortropane hydrochloride

[Ic: $R_1$ is H; Y is $(CH_2)_3$; A is $CH_2$; n is 1] was prepared by reducing, with 4.0 g. (0.105 mole) of lithium aluminum hydride in 300 ml. of dry tetrahydrofuran, about 10 g. (0.034 mole) of 8-[β-(1-indolyl)-propionyl] nortropane using the manipulative procedure described above in Example 20. (The latter was prepared by reacting the mixed anhydride, obtained by the reaction of 9.46 g. (0.05 mole) of β-(1-indolyl)propionic acid with 6.85 g. (0.05 mole) of isobutyl chloroformate in 300 ml. of acetone in the presence of 5.5 g. (0.055 mole) of triethylamine, with 5.45 g. (0.05 mole) of nortropane in 150 ml. of acetone using the manipulative procedure described above in Example 20.) The product was isolated in the form of the hydrochloride salt, and the latter was recrystallized from an isopropanol-hexane mixture giving 5.73 g. of 8-[3-(1-indolyl)propyl]nortropane hydrochloride, M.P. 215–218.2° C. (corr.).

EXAMPLE 22

8-[3-(1-indolyl)propyl]nortropidine

[IIc: $R_1$ is H; Y is $(CH_2)_3$; n is 1] was prepared by reducing, with 4.0 g. (0.105 mole) of lithium aluminum hydride in 300 ml. of dry tetrahydrofuran, 8-[β-(1-indolyl)propionyl]nortropidine using the manipulative procedure described above in Example 20. (The latter was prepared by reacting the mixed anhydride, obtained by the reaction of β-(1-indolyl)propionic acid with isobutyl chloroformate in acetone in the presence of triethylamine, with nortropidine in acetone using the manipulative procedure described above in Example 20.) The product thus obtained, in the form of its free base, was recrystallized from an isopropanol-ether mixture giving 3.66 g. of 8-[3-(1-indolyl)propyl]nortropidine, M.P. 177.6–178.4° C. (corr.).

EXAMPLE 23

8-[3-(1-indolyl)propyl]-3α-hydroxynortropane hydrochloride

[Ic: $R_1$ is H; Y is $(CH_2)_3$; A is CHOH; n is 1] was prepared by reducing, with 5.7 g. (0.15 mole) of lithium aluminum hydride in 250 ml. of dry tetrahydrofuran, 7.0 g. (0.024 mole) of 8-[β-(1-indolyl)-propionyl]-3α-hydroxynortropane (M.P. 154.2–155.4° C., corr., recrystallized from ethyl acetate-hexane) using the manipulative procedure described above in Example 20. (The latter was prepared by reacting the mixed anhydride, obtained by the reaction of 9.46 g. (0.05 mole) of β-(1-indolyl) propionic acid with 6.85 g. (0.05 mole) of isobutyl chloroformate in 200 ml. of acetone in the presence of 5.5 g. (0.05 mole) of triethylamine, with 6.4 g. (0.05 mole) of nortropine in 300 ml. of acetone using the manipulative procedure described above in Example 20.) The product was isolated in the form of the hydrochloride salt and the latter recrystallized from an ethanol-ether mixture giving 1.17 g. of 8-[3-(1-indolyl)propyl]-3α-hydroxynortropane hydrochloride, M.P. 208.0–209.4° C. (corr.).

EXAMPLE 24

8-[3-(3-indolyl)propyl]nortropidine

[IIa: $R_1$ and $R_2$ are H; Y is $(CH_2)_3$; n is 1] was prepared by reducing, with 1.9 g. (0.05 mole) lithium aluminum hydride in 260 ml. of tetrahydrofuran, 7.0 g. (0.025 mole) of 8-[β-(3-indolyl)propionyl]nortropidine (M.P. 109.2–110.2° C., corr., recrystallized from ethyl acetate-hexane) using the manipulative procedure described above in Example 20. (The latter was prepared by reacting the mixed anhydride, obtained by the reaction of 9.46 g. (0.05 mole) of β-(3-indolyl)propionic acid with 6.8 g. (0.05 mole) of isobutyl chloroformate in 150 ml. of acetone in the presence of 5.5 g. (0.05 mole) of triethylamine with 5.45 g. (0.05 mole) of nortropidine in 100 ml. of acetone using the manipulative procedure described above in Example 20.) The product thus obtained was isolated in the form of the free base and recrystallized from hexane giving 3.85 g. of 8-[3-(3-indolyl)propyl]-nortropidine, M.P. 106.6–108.0° C.

EXAMPLE 25

8-[4-(3-indolyl)butyl]nortropidine

[IIc: $R_1$ and $R_2$ are H; Y is $(CH_2)_4$; n is 1] was prepared by reducing, with 7.6 g. (0.20 mole) of lithium aluminum hydride in 300 ml. of tetrahydrofuran, 8-[γ-(3-indolyl)-butyryl]nortropidine using the manipulative procedure described above in Example 20. (The latter was prepared by reacting the mixed anhydride, obtained by the reaction of 20.32 g. (0.10 mole) of γ-(3-indolyl)butyric acid with 13.66 g. (0.10 mole) of isobutyl chloroformate in 150 ml. of acetone in the presence of 11.12 g. (0.11 mole) of triethylamine, with 10.92 g. (0.10 mole) of nortropidine in 350 ml. of acetone using the manipulative procedure described above in Example 20.) The product thus obtained was recrystallized from hexane to give 8.79 g. of 8-[4-(3-indolyl)butyl]nortropidine, M.P. 104.0–106.0° C. (corr.).

EXAMPLES 26–40

By reacting an appropriate substituted β-(2-indolyl)-propionic acid with an appropriate 1,5-iminocycloalkane in the presence of triethylamine and isobutyl chloroformate using the manipulative procedure described above in Example 20 and reducing the resulting 8-[β-(2-indolyl)-propionyl]-1,5-iminocycloalkane with lithium aluminum hydride using the manipulative procedure described above in Example 20, there can be obtained the compounds of Formula Ib listed below in Table 2 where Y in each case is $(CH_2)_3$, and n in each case is 1, and where the column headed "Indole subst." refers to the substituent in the benzene ring of the indole nucleus.

TABLE 2

| Example | Indole subst. | $R_2$ | A |
|---|---|---|---|
| 26 | 5-$C_6H_5CH_2O$ | $CH_3$ | $C(OH)(COOC_2H_5)$ |
| 27 | 5-$CH_3COO$ | $C_6H_5CH_2$ | $C(OH)(C_2H_5)$ |
| 28 | 5-$HOOC(CH_2)_3COO$ | 4-$CH_3C_6H_4CH_2CH_2$ | $CHOCOC_6H_5$ |
| 29 | 5-$C_6H_5COO$ | 4-$ClC_6H_4CH_2CH_2$ | $CHOCOC_6H_4$-4-Cl |
| 30 | 5-$C_6H_5CH_2COO$ | 4-$CH_3OC_6H_4CH_2$ | $CHOCOC_6H_4$-4-$OCH_3$ |
| 31 | 5-$CH_2=CHCOO$ | 4-$CH_3SC_6H_4CH_2$ | $CHOCOC_6H_4$-4-$SCH_3$ |
| 32 | 7-$C_6H_5CH=CHCOO$ | 4-$CH_3SO_2C_6H_4CH_2$ | $CHOCOC_6H_4$-4-$SO_2CH_3$ |
| 33 | 4-$NH_2COO$ | 3-$CF_3C_6H_4CH_2$ | $CHOCOC_6H_4$-3-$CF_3$ |
| 34 | 7-$CH_3NHCOO$ | 3-$NH_2SO_2C_6H_4CH_2$ | $CHOCOC_6H_4$-3-$SO_2NH_2$ |
| 35 | 6-$(CH_3)_2NCOO$ | 3,4-$\overline{OCH_2O}C_6H_3CH_2$ | $CHOC\overline{OC_6H_3OCH_2O}$-(3,4) |
| 36 | H | 3-$C_6H_5CH_2OC_6H_4CH_2$ | $CHOCOC_6H_4$-3-$OCH_2C_6H_5$ |
| 37 | H | 3-$NO_2C_6H_4CH_2$ | $CHOCOC_6H_4$-3-$NO_2$ |
| 38 | H | 3-$NCC_6H_4CH_2$ | $CHOCOC_6H_4$-3-CN |
| 39 | 5-$CH_3O$-6-$C_2H_5O$ | 4-$CH_3$-3-$ClC_6H_3CH_2$ | $CHOCOCH_2C_6H_5$ |
| 40 | 5-HO-6-$CH_3O$ | $C_6H_5CH_2$ | $CHOCOCH=CHC_6H_5$ |

EXAMPLES 41–52

By following the manipulative procedure described above in Example 1, substituting for the 3-(3-indolyl)-propyl bromide and the nortropine used therein equivalent amounts of an appropriate substituted 3-(3-indolyl)-lower-alkyl halide and 3-granataninol, there can be obtained the compounds of Formula Ia listed below in Table 3 where $R_1$ and $R_2$ in each case are both H, $n$ in each case is 2, and A in each case is CHOH, and where the column headed "Indole subst." refers to the substituent in the benzene ring of the indole nucleus.

TABLE 3

| Example | Indole subst. | Y |
|---|---|---|
| 41 | 4-$C_6H_5CH_2O$ | $CH(CH_3)CH_2$ |
| 42 | 6-(4-$CH_3C_6H_4CH_2O$) | $CH_2CHCH_3$ |
| 43 | 5-(4-$ClC_6H_4CH_2O$) | $(CH_2)_4$ |
| 44 | 7-(4-$CH_3OC_6H_4CH_2O$) | $(CH_2)_5$ |
| 45 | 5-(4-$CH_3SC_6H_4CH_2O$) | $(CH_2)_5$ |
| 46 | 5-(4-$CH_3SO_2C_6H_4CH_2O$) | $(CH_2)_3$ |
| 47 | 7-(3-$CF_3C_6H_4CH_2O$) | $(CH_2)_2$ |
| 48 | 7-(3-$NH_2SO_2C_6H_4CH_2O$) | $(CH_2)_3$ |
| 49 | 5-(3,4-$\overline{OCH_2O}C_6H_3CH_2O$) | $(CH_2)_3$ |
| 50 | 5-(3-$C_6H_5CH_2OC_6H_4CH_2O$) | $(CH_2)_3$ |
| 51 | 7-(3-$NO_2C_6H_4CH_2O$) | $(CH_2)_3$ |
| 52 | 7-(3-$NCC_6H_4CH_2O$) | $(CH_2)_3$ |

I claim:

1. A compound having the formula

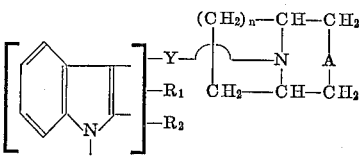

or the formula

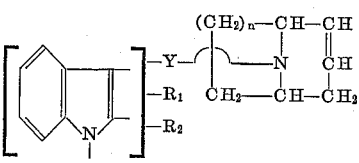

where any of the three free valences at the 1-, 2-, and 3-positions of the indole nucleus can be taken up by the 1,5 - iminocycloalkanyl - lower - alkyl or 1,5-iminocycloalkenyl-lower-alkyl groups, and the valences at the 1- and 2-positions, when not taken up by the said groups, are taken up by the groups $R_2$ and $R_1$, respectively; $R_1$ is hydrogen, lower-alkyl, or phenyl; $R_2$ is hydrogen, lower-alkyl, or phenyl-lower-alkyl; Y is lower-alkylene; $n$ is an integer from 1 to 2; and A is $CH_2$, CHOH, C=O, CHCl, CHBr, CH(OAcyl) wherein Acyl represents a member selected from the group consisting of lower alkanoyl, carboxy-lower-alkanoyl, benzoyl, phenylacetyl, lower-alkenoyl, cinnamoyl and carbamyl, C(OH)(COO-lower-alkyl), or C(OH)(lower-alkyl).

2. A compound according to claim 1 having the formula

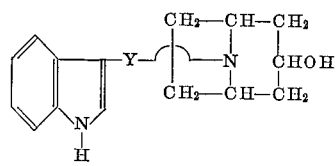

3. A compound according to claim 1 having the formula

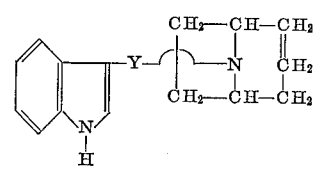

4. A compound according to claim 1 having the formula

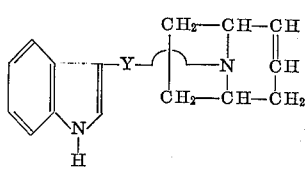

5. A compound according to claim 1 having the formula

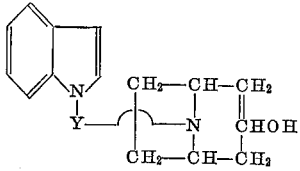

6. A compound according to claim 1 having the formula

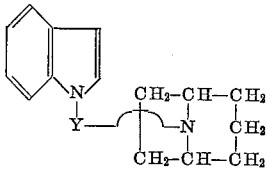

7. A compound according to claim 1 having the formula

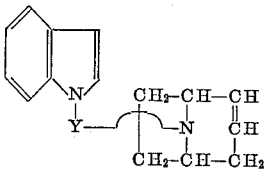

8. 8 - [2 - (3 - indolyl)ethyl] - 3α - hydroxynortropane according to claim 2 where Y is 1,2-ethylene.

9. 8 - [2 - (3 - indolyl)ethyl] - 3β - hydroxynortropane according to claim 2 where Y is 1,2-ethylene.

10. 8 - [3 - (3 - indolyl)propyl]-3α-hydroxynortropane according to claim 2 where Y is 1,3-propylene.

11. 8 - [2 - (3-indolyl)ethyl]nortropane according to claim 3 where Y is 1,2-ethylene.

12. 8 - [3 - (3 - indolyl)propyl]nortropane according to claim 3 where Y is 1,3-propylene.

13. 8 - [3-(3-indolyl)propyl]nortropidine according to claim 4 where Y is 1,3-propylene.

14. 8 - [3 - (1 - indolyl)propyl]-3α-hydroxynortropane according to claim 5 where Y is 1,3-propylene.

15. 8 - [3 - (1-indolyl)propyl]nortropane according to claim 6 where Y is 1,3-propylene.

16. 8 - [3 - (1-indolyl)propyl]nortropidine according to claim 7 where Y is 1,3-propylene.

References Cited

UNITED STATES PATENTS 3,264,309  8/1966  Zenitz _____ 260—292

JOHN D. RANDOLPH, *Primary Examiner.*

A. ROTMAN, *Assistant Examiner.*

UNITED STATES PATENT OFFICE
CERTIFICATE OF CORRECTION

Patent No. 3,365,457                                January 23, 1968

Bernard L. Zenitz

It is hereby certified that error appears in the above numbered patent requiring correction and that the said Letters Patent should read as corrected below.

Column 1, after the second formula insert -- Ib --. Column 5, lines 55 to 60, the right-hand portion should appear as shown below:

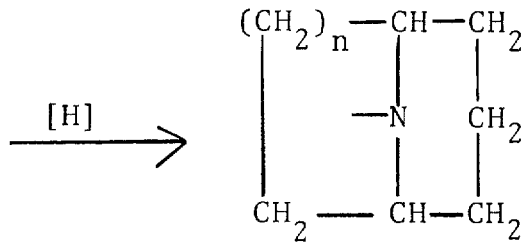

Column 14, lines 32 to 40, the formula should appear as shown below

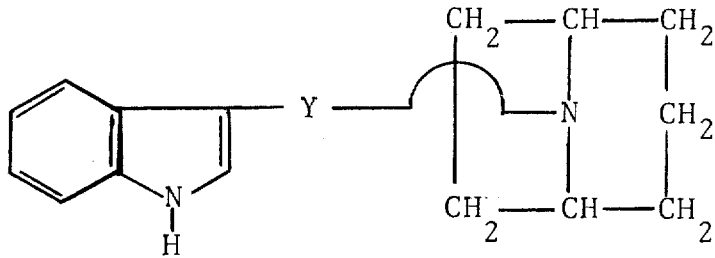

lines 50 to 58, the formula should appear as shown below:

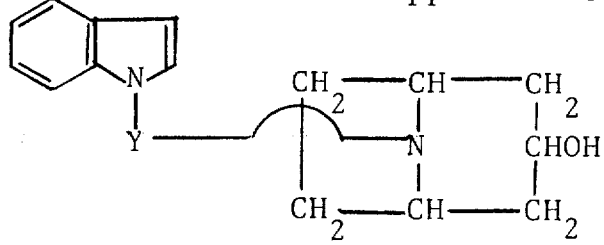

Signed and sealed this 5th day of August 1969.

(SEAL)
Attest:

EDWARD M. FLETCHER, JR.                      WILLIAM E. SCHUYLER, JR.
Attesting Officer                                    Commissioner of Patents